POLYAMIDE SCOPE 30, 40g/100ml SOLVENT

POLYAMIDE VERSAMID 711, 40g/100ml SOLVENT

INVENTOR
LLOYD E. COCKERHAM

POLYAMIDE VERSAMID 725, 40g/100ml SOLVENT

POLYAMIDE VERSAMID 940, 40g/100ml SOLVENT

POLYAMIDE VERSAMID 930, 40g/100ml SOLVENT

POLYAMIDE POLYMID 1155, 40g/100ml SOLVENT

INVENTOR
LLOYD E. COCKERHAM

POLYAMIDE POLYMID 1074,
40g/100 ml SOLVENT

POLYAMIDE SUNKEM 562A,
40g/100 ml SOLVENT

INVENTOR
LLOYD E. COCKERHAM

POLYAMIDE EMEREZ 1535, 40g/100ml SOLVENT

POLYAMIDE EMEREZ 1530, 40g/100ml SOLVENT

INVENTOR
LLOYD E. COCKERHAM

United States Patent Office 3,450,663
Patented June 17, 1969

3,450,663
TERNARY SOLVENT SYSTEM CONTAINING 2-NITROPROPANE FOR FLEXOGRAPHIC INKS
Lloyd E. Cockerham, Terre Haute, Ind., assignor to Commercial Solvents Corporation, New York, N.Y., a corporation of Maryland
Filed Sept. 12, 1966, Ser. No. 578,654
Int. Cl. C09d 11/10
U.S. Cl. 260—33.4     9 Claims

ABSTRACT OF THE DISCLOSURE

Improved solvent compositions having utility for formulating and thinning flexographic inks based on a polyamide resin vehicle, consisting of an aliphatic alcohol, an aliphatic hydrocarbon and 2-nitropropane.

---

Figure 1:
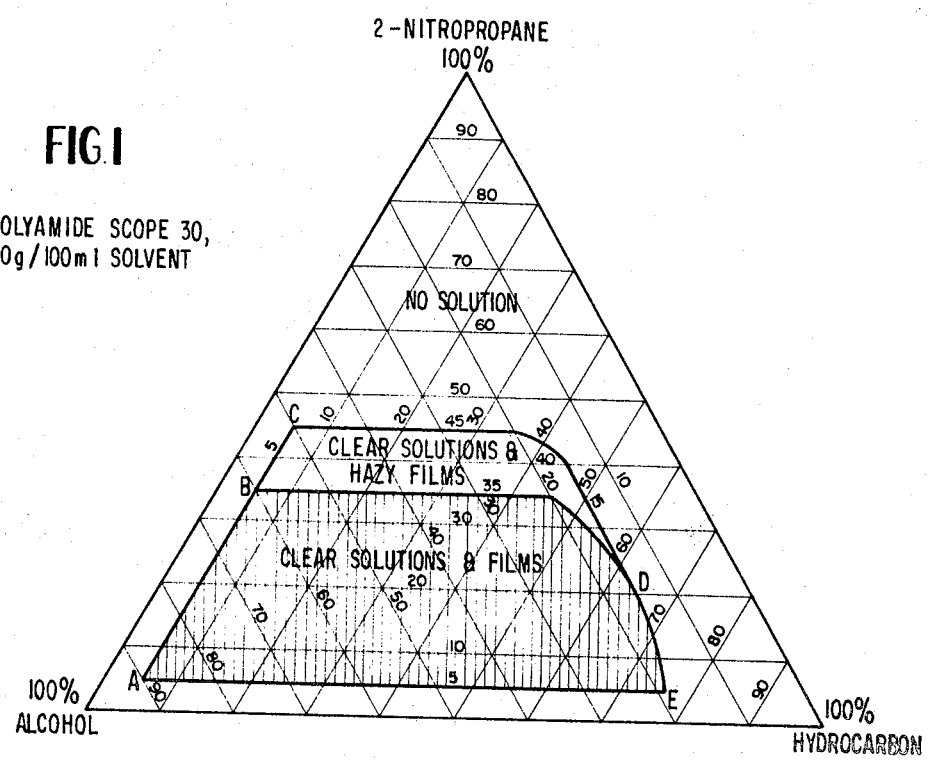

This invention relates generally to improve printing ink compositions. In a particular aspect it relates to flexographic printing ink compositions having a polyamide resin as the vehicle and having a solvent system therefor containing 2-nitropropane, an aliphatic alcohol and an aliphatic hydrocarbon.

Flexographic inks consist generally of a solids portion and a liquid portion. The solids portion consists of the pigment and a vehicle therefor plus other non-volatile additives which may be desired. The pigment provides color and opacity and the vehicle is a polymeric substance which binds the pigment to the substratum, e.g. paper, textile and the like. A number of polymeric substances have been used as a vehicle in flexographic inks, and the polyamide class of resins has been found particularly useful. The liquid portion, generally known as the solvent system, consists of volatile solvents which upon evaporation deposit the solids portion. The solvent system generally consists of one or more volatile solvents for the vehicle as well as one or more non-solvent diluents, which are usually cheaper than solvents and are used to minimize the cost of the solvent system.

Flexographic inks are usually manufactured in a concentrated form and are then thinned at the time of use to the desired viscosity. The solvent system used for dilution can be formulated to match the solvent system of the concentrate, or it can be different. The concentrated ink generally consists of 30% to 70% by weight of solids of which from 10% to 75%, generally from 30 to 60% by weight is pigment, and the remainder is the polymeric vehicle plus other non-volatile additives, if any.

During the printing operation, the fluid ink is applied to the substratum by means of a rubber plate and the solvent evaporates, depositing the solids portion on the substratum. One of the problems faced by the formulator of flexographic inks is to select a solvent system which will not swell the rubber plate nor cause it to deteriorate. Polyamide resins, however, are not very soluble in the solvents and diluents which are satisfactory for use with rubber. Accordingly, inks in which polyamide resins are employed as the vehicle have previously been largely limited to formulations in which the solvent system is a mixture of aliphatic alcohols and aliphatic hydrocarbons. However, even these mixtures have a limited but undesirable attack on the rubber plates. In addition, these mixtures are quite volatile and lead to difficulties in connection with drying speed and high viscosity.

It is an object of this invention to provide improved flexographic printing ink compositions.

It is another object of this invention to provide flexographic printing ink compositions having a polyamide resin as the vehicle and having a solvent system containing 2-nitropropane, an aliphatic alcohol and an aliphatic hydrocarbon.

Still another object is to provide a solvent system for flexographic inks characterized by having minimal adverse effect on rubber.

Yet another object is to provide improved thinners for flexographic inks having a polyamide vehicle.

Other objects of this invention will be apparent to those skilled in the art from the description herein.

It has been found that improved flexographic ink compositions having a polyamide resin vehicle are obtained by using a solvent system comprising an aliphatic alcohol, an aliphatic hydrocarbon and 2-nitropropane. By comparison with inks formulated with a solvent system consisting solely of alcohol and hydrocarbon, the improved ink compositions are characterized by having lower viscosities, more easily controlled rate of drying, and minimal swelling and softening of the rubber plate. Advantageously, the solvent system of this invention can be employed as a thinner to thin a concentrated ink to the desired viscosity at the time of use.

The actual proportions of 2-nitropropane, aliphatic alcohol and aliphatic hydrocarbon suitable for use in the practice of this invention can be varied considerably and are selected in accordance with the concentration of the polyamide resin, the viscosity desired, the characteristics of the particular polyamide resin to be employed, and the normal variations in solubility which occur from one lot of a particular resin to another. It is usually desirable, but not necessary, to select solvent proportions which provide clear or slightly hazy solutions and which deposit clear or slightly hazy films when unpigmented. Another type of hazy solution can occur due to the presence of a small fraction of insoluble high polymer which is insoluble regardless of the solvent proportions and yields a slight cloud instead of a clear solution or film. The term "solution" is intended to include true solutions as well as dispersions and colloidal suspensions. The concentration of polyamide resin employed is generally within the range of from about 30 g./100 ml. to about 50 g./100 ml., preferably from about 35 to about 45 g./100 ml. Usually the preferred concentration is about 40 g./100 ml. When smaller concentrations than about 40 g./100 ml. of polyamide are employed, the proportions of 2-nitropropane and hydrocarbon can generally be higher than when concentrations of about 40 g./100 ml. polyamide or higher are employed.

Generally, when the polyamide concentration is about 40 g./100 ml. or less, the proportions of 2-nitropropane-alcohol-hydrocarbon which comprise the solvent system of this invention can vary from approximately 5% to approximately 65% of 2-nitropropane, from approximately 15% to approximately 90% of aliphatic alcohol, and from approximately 5% to approximately 80% of aliphatic hydrocarbon. These percentages and those given hereinafter are percentages by volume at ambient temperatures, e.g. at about 77° F. The proportions of the solvent system can be described in more detail in relation to a particular polyamide resin at a particular concentration. For example the preferred proportions of the components of the solvent system are set forth below for some commonly used polyamide resins when used at a concentration of 40 g./100 ml. of solvent.

When the polyamide resin is Scope 30, described below, the proportions can very from approximately 5% to approximately 45%, preferably 5% to 35%, of 2-nitropropane; from approximately 15% to approximately 90% of aliphatic alcohol; and from approximately 5% to approximately 75% of aliphatic hydrocarbon. The solvent systems within the area ACDEA of FIG. 1 are suitable for the practice of this invention, and those within the shaded area ABDEA are preferred.

Figure 2:
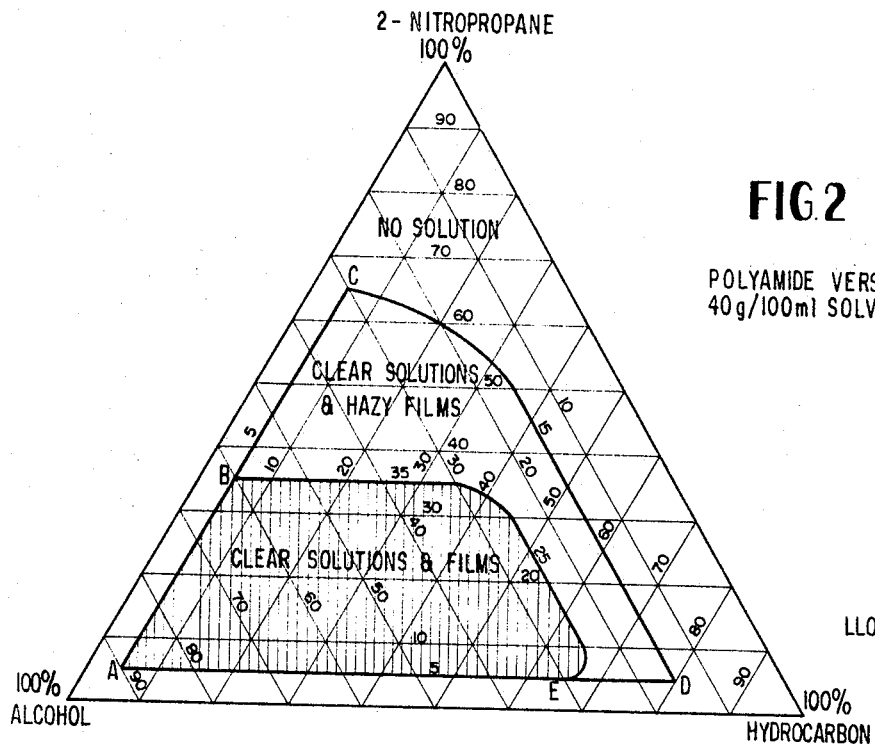

When the polyamide is Versamid 711, described below, the proportions can vary from approximately 5% to approximately 65%, preferably from 5% to 35% 2-nitropropane; from approximately 15% to approximately 90%, preferably from 25% to 90% aliphatic alcohol; and from approximately 5% to approximately 85%, preferably from 5% to 65% aliphatic hydrocarbon. The solvent systems within the area ACDEA of FIG. 2 are suitable for the practice of this invention, and those within the shaded area ABEA are preferred.

Figure 3:
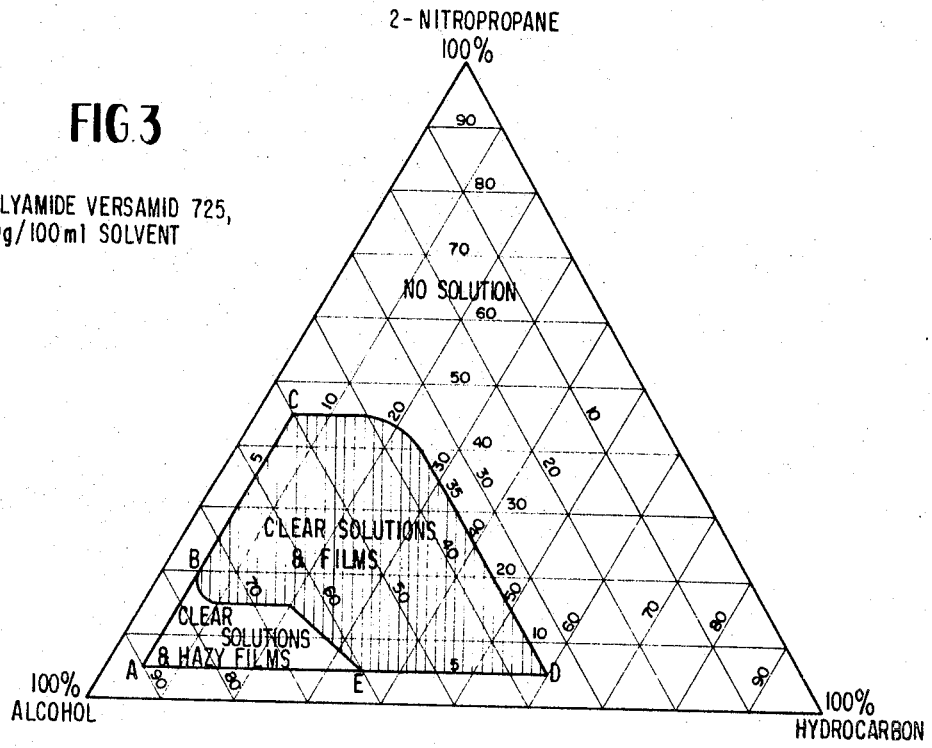

When the polyamide is Versamid 725, described below, the proportions can vary from approximately 5% to approximately 45% 2-nitropropane; from approximately 35% to approximately 90%, preferably from 35% to 75%, aliphatic alcohol; and from approximately 5% to approximately 60% aliphatic hydrocarbon. The solvent systems represented by the shaded area ACDEA of FIG. 3 are suitable for the practice of this invention and the systems represented by the shaded area BCDEB are preferred.

Figure 4:
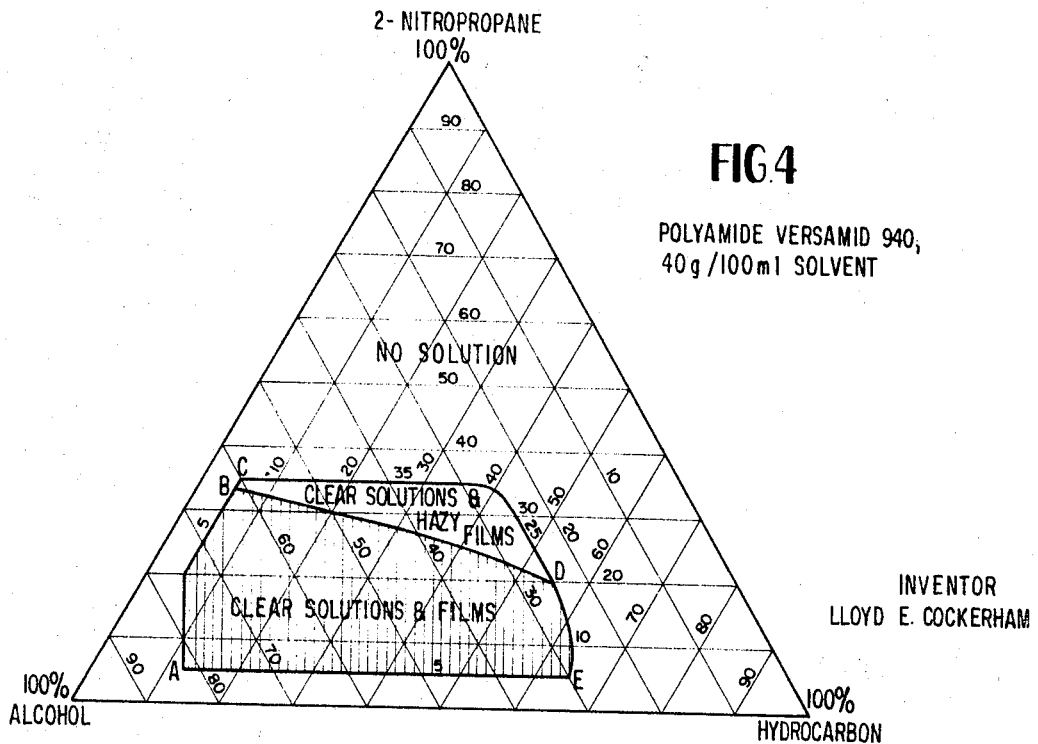

When the polyamide is Versamid 940, described below, the proportions can vary from approximately 5% to approximately 35% 2-nitropropane, from approximately 25% to approximately 80% aliphatic alcohol, and from approximately 5% to approximately 65% aliphatic hydrocarbon. The solvent systems represented by the area ACDEA of FIG. 4 are suitable for the practice of this invention and the systems represented by the shaded area ABDEA are preferred.

Figure 5:
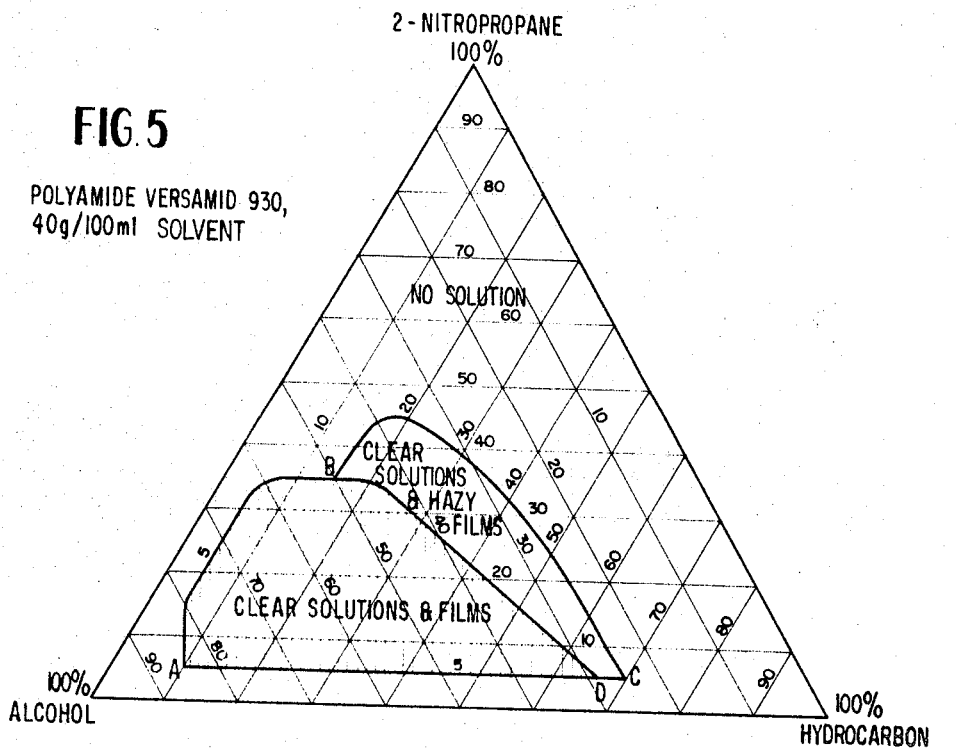

When the polyamide is Versamid 930, described below, the proportions can vary from approximately 5% to approximately 45%, preferably 5% to 35% 2-nitropropane; from approximately 25% to approximately 85% aliphatic alcohol; and from approximately 5% to approximately 70% aliphatic hydrocarbon. The solvent systems represented by the area ABCDA of FIG. 5 are suitable for the practice of this invention and the systems represented by the shaded area ABDA are preferred.

Figure 6:
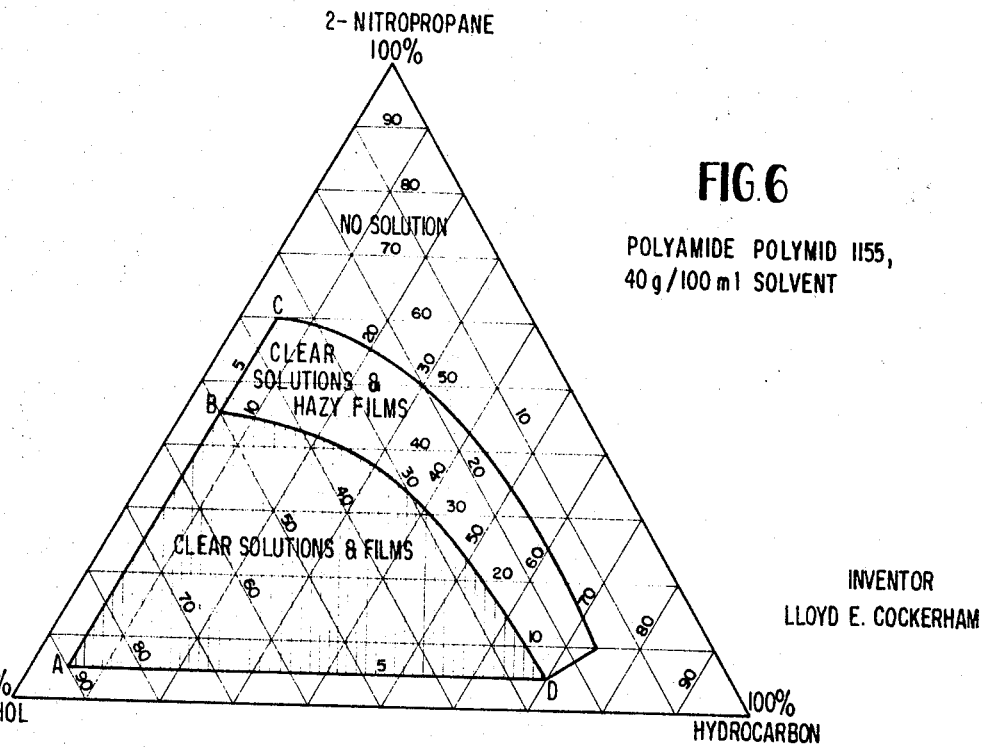

When the polyamide is Polymid 1155, described below, the proportions can vary from approximately 5% to approximately 60%, preferably 5% to 45% 2-nitropropane; from approximately 15% to approximately 90%, preferably 25% to 90% aliphatic alcohol; and from approximately 5% to approximately 75%, preferably 5% to 70% aliphatic hydrocarbon. The solvent systems represented by the area ACDA of FIG. 6 are suitable for the practice of this invention and the systems represented by the shaded area ABEA are preferred.

Figure 7:
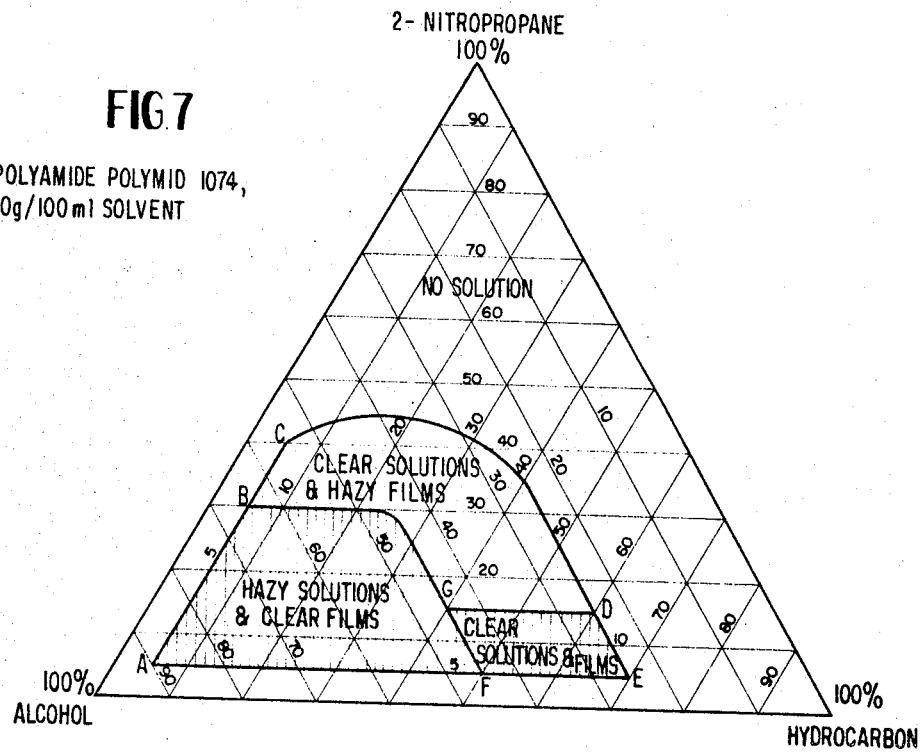

When the polyamide is Polymid 1074, described below, the proportions can vary from approximately 5% to approximately 45% 2-nitropropane, from approximately 25% to approximately 90% aliphatic alcohol, and from approximately 5% to approximately 70% aliphatic hydrocarbon. The solvent systems represented by the area ACEA of FIG. 7 are suitable for the practice of this invention. The preferred solvent systems are represented by the area ABGDEA. The particularly preferred solvent systems are represented by the area FGDEF wherein the 2-nitropropane can vary from 5% to 15%, the aliphatic alcohol from 25% to 85% and the aliphatic hydrocarbon from 40% to 70%.

When the polyamide is Sunkem 562A, described below, the proportions can vary from approximately 5% to approximately 55% 2-nitropropane, from approximately 15% to approximately 90% aliphatic alcohol, and from approximately 5% to approximately 80% aliphatic hydrocarbon. The preferred solvent systems are those having from 5% to 35% 2-nitropropane, from 35% to 90% aliphatic alcohol and from 5% to 60% aliphatic hydrocarbon. The solvent systems represented by the area ACDA are suitable for the practice of this invention and the solvent systems represented by the shaded area ABEA are preferred.

Figure 9:
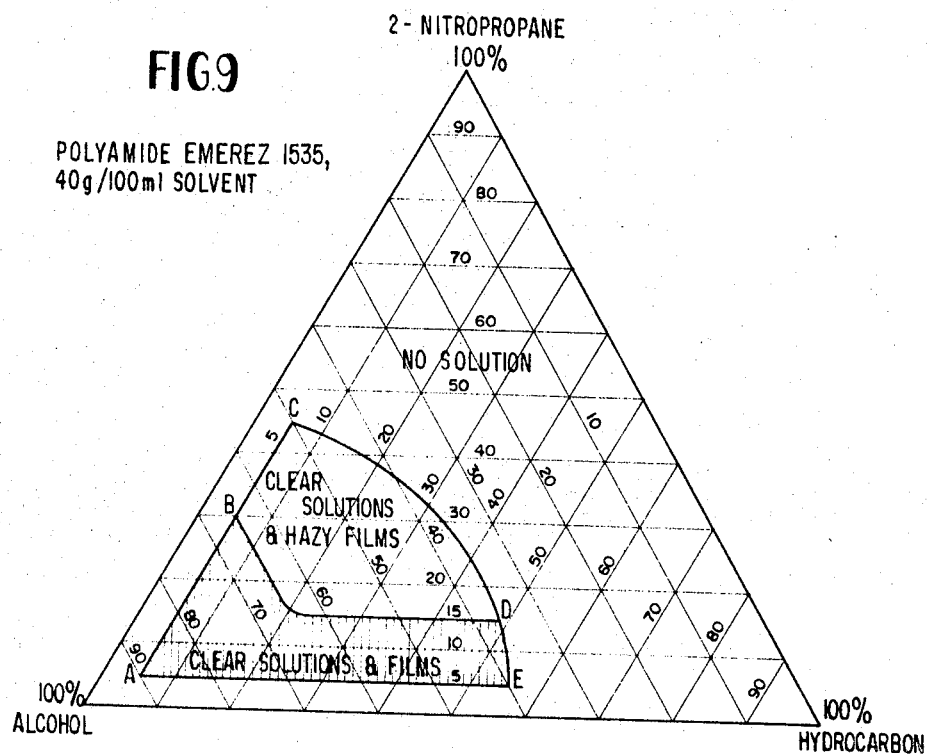

When the polyamide is Emerez 1535, described below, the proportions can vary from approximately 5% to approximately 45%, preferably from 5% to 30% 2-nitropropane; from approximately 35% to approximately 90% aliphatic alcohol; and from approximately 5% to approximately 55% aliphatic hydrocarbon. When the 2-nitropropane content is from 15% to 30%, the isopropyl alcohol content is from 65% to 90% and the aliphatic hydrocarbon content is from 5% to 20%. The solvent systems represented by the area ACEA of FIGURE 9 are suitable for the practice of this invention and the solvent systems represented by the shaded area ABDEA are preferred.

Figure 10:
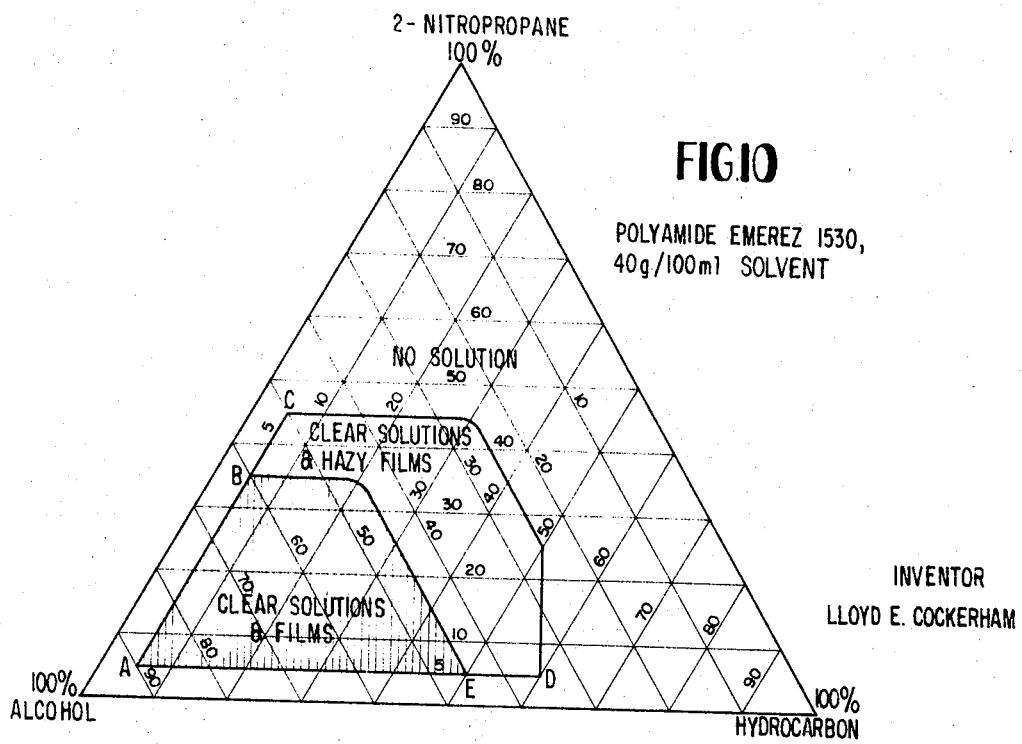

When the polyamide is Emerez 1530, described below, the proportions can vary from approximately 5% to approximately 45% 2-nitropropane, from approximately 25% to approximately 90% aliphatic alcohol, and from approximately 5% to approximately 60% aliphatic hydrocarbon. The solvent systems represented by the area ACDA of FIGURE 10 are suitable for the practice of this invention and the solvent systems represented by the shaded area ABEA are preferred.

Polyamide resins are polymeric substances generally obtained by reacting a polyamide having two or more amino groups per molecule with polycarboxylic acid having two or more acid groups per molecule. The polyamide resins useful in the practice of this invention include but are not limited to the following commercial polymers:

Scope 30.—Marketed by S. C. Johnson & Son and having the following properties:

Softening point, ring and ball
 method _____ 98–100° C.
Viscosity, 40% by wt. in 99%
 isopropyl alcohol _____ L–M, Gardner-Holdt.
Color (40% by wt. in 99% iso-
 propyl alcohol) _____ 8 max., Gardner.
Specific gravity _____ 0.99.

Versamides 711, 725, 940, and 930 corresponding to the formula HO(—OC—R—CONHR'NH—)$_n$H.—Marketed by General Mills Co.; manufactured from dimerized linoleic acid with di- or polyamines as described in U.S. Patent 2,379,413; in the above formula, R is a hydrocarbon group of an indefinite configuration containing 34 carbon atoms and in Versamide 930 and 940, which are made from ethylene diamine, R' is

—CH$_2$—CH$_2$—

The molecular weights are in the range of 6,000–9,000 and $n$ varies accordingly and having the following properties:

|  | Color Gardner, Solid | Viscosity, poises at 160° C. | Softening Point, ASTM E-28 modified, ° C. | Specific Gravity, 25/25 |
|---|---|---|---|---|
| Versamid: |  |  |  |  |
| 711_____ | 9 | 2.0–5.0 | 105–115 | 0.975 |
| 725_____ | ª7 | 3.5–7.0 | 125–135 | 0.963 |
| 930_____ | 12 | 21–27 | 105–115 | _____ |
| 940_____ | 12 | 12–18 | 105–115 | _____ |

ª 40% by weight in 1:1 99% isopropanol-Super Naphtholite (American Mineral Spirits Co.).

Polymid 1074 and 1155.—Marketed by Lawter Chemical Company.

|  | M.P., ° C. | Gardner-Holdt Viscosity | Specific Gravity | Color Gardner 1933 |
|---|---|---|---|---|
| Polymid: |  |  |  |  |
| 1074_____ | 102–108 | E–H(¹) | 0.98 | *7 |
| 1155_____ | 114 | D–E(²) | 0.98 | **9 |

*40% by weight in 70% toluene, 30% isopropanol.
**50% by weight solids in 95% ethanol.

Emerez 1535 and 1530.—Marketed by Emery Industries and having the following properties:

| | Softening Point, ASTM E-28-58-T, °C. | Viscosity, Poises, at 160 ASTM D-445-61 | Color Gardner 1953 AOCS Ka3-58 |
|---|---|---|---|
| Emerez: | | | |
| 1530 | 105-115 | 21-27 | 12 |
| 1535 | 127-135 | 5-10 | 12 |

Sunkem 526A.—Marketed by Sun Chemical Company and having the following properties:

Color (Gardner-Hellige at 40% solids) _____ 8.0
Melting point _____ 93° C. min.
Specific gravity at 25° C., approx. _____ 0.98
Viscosity, Gardner-Holdt:
    40% by weight in 95% ethanol _____ A
    40% by weight in 99% isopropyl alcohol ____ B-C
Penetration at 25° C. (ASTM Method D5-52) _____ 0

The aliphatic alcohols useful in the practice of this invention include ethanol and isopropyl alcohol. Ethanol can be obtained only in the form of a proprietary solvent or as a denatured alcohol formula, so isopropyl alcohol is generally preferred. The commercially available anhydrous material containing 1% or less water is satisfactory for the practice of this invention.

The aliphatic hydrocarbon useful in the practice of this invention is derived from petroleum. It is the fraction having a boiling range within the range of from about 200° F. to about 280° F. A preferred product is that known as "Lactol Spirits," marketed by American Mineral Spirits Company.

The 2-nitropropane used in the practice of this invention is a commercially available product, and the ordinary commercial grade material is satisfactory for the practice of this invention.

The practice of this invention is further illustrated by the following examples. It is not intended however that this invention be limited to the exact procedures set forth therein. It is intended to include all equivalents obvious to the art.

EXAMPLE 1

Scope 30, 40 g. was dispersed in 100 ml. of a solvent system consisting of, by volume, 2-nitropropane, 10 parts, Lactol Spirits, 70 parts and isopropyl alcohol 20 parts in an 8 oz. jar. The temperature was ambient temperature, i.e. about 77° F. The jar containing the mixture was rolled on a roller mill until the resin dissolved. The solution was clear and had a viscosity of 107 centipoises. A portion of the solution was flowed onto a glass plate and allowed to dry. A clear polyamide film was deposited.

A printing ink is prepared by incorporating into the above composition a pigment or mixture of pigments selected, to provide the desired color and in an amount to provide the desired opacity.

EXAMPLES 2-24

The experiment of Example 1 was repeated except that the solvent systems had the compositions and viscosities set forth in Examples 2-24, and shown graphically in FIGURE 1. Solvent systems within the enclosed area are suitable for the practice of this invention and solvent systems within the shaded area are preferred. The compositions of these examples were clear solutions and deposited clear films, except for the compositions of Examples 8, 13, 17, 19 and 22 which deposited hazy to cloudy films.

Printing inks are prepared by incorporating into these compositions a pigment or mixture of pigments selected to provide the desired color and in an amount to provide the desired opacity. They can be thinned at the press to the desired viscosity as needed.

COMPOSITION OF SOLVENT SYSTEM

| Example No. | 2-nitropropane, ml. | Isopropyl Alcohol, ml. | Lactol Spirits, ml. | Viscosity, Centipoises |
|---|---|---|---|---|
| 2 | 5 | 90 | 5 | 141 |
| 3 | 10 | 80 | 10 | 138 |
| 4 | 20 | 70 | 10 | 109 |
| 5 | 30 | 60 | 10 | 87 |
| 6 | 20 | 60 | 20 | 97 |
| 7 | 10 | 60 | 30 | 114 |
| 8 | 40 | 50 | 10 | 77 |
| 9 | 30 | 50 | 20 | 88 |
| 10 | 20 | 50 | 30 | 86 |
| 11 | 10 | 50 | 40 | 97 |
| 12 | 10 | 20 | 70 | 109 |
| 13 | 40 | 40 | 20 | 72 |
| 14 | 30 | 40 | 30 | 73 |
| 15 | 20 | 40 | 40 | 80 |
| 16 | 10 | 40 | 50 | 92 |
| 17 | 40 | 30 | 30 | 81 |
| 18 | 20 | 30 | 50 | 90 |
| 19 | 40 | 20 | 40 | 101 |
| 20 | 20 | 20 | 60 | 124 |
| 21 | 10 | 25 | 65 | 128 |
| 22 | 30 | 20 | 50 | 103 |
| 23 | 10 | 20 | 70 | 109 |
| 24 | 30 | 30 | 40 | 85 |

EXAMPLES 25-51

The experiment of Example 1 was repeated except that Versamid 711 was selected as the polyamide. The solvent systems had the compositions and viscosities set forth in Examples 20-37, and shown graphically in FIGURE 2. The solvent systems within the enclosed area are suitable for the practice of this invention and those within the shaded area are preferred. The compositions of these examples were clear solutions except the composition of Example 41, which was slightly hazy. The films deposited from these compositions were clear except those from the compositions of Examples 32, 36, 37, 41-43 and 47-51, which were hazy to cloudy in appearance.

Printing inks are prepared by incorporating into these compositions a pigment or mixture of pigments selected to provide the desired color and in an amount to provide the desired opacity. They can be thinned at the press to the desired viscosity as needed.

COMPOSITION OF SOLVENT SYSTEM

| Example No. | 2-nitropropane, ml. | Isopropyl Alcohol, ml. | Lactol Spirits, ml. | Viscosity, Centipoises |
|---|---|---|---|---|
| 25 | 5 | 90 | 5 | 35 |
| 26 | 10 | 80 | 10 | 21 |
| 27 | 20 | 70 | 10 | 18 |
| 28 | 10 | 70 | 20 | 20 |
| 29 | 30 | 60 | 10 | 17 |
| 30 | 20 | 60 | 20 | 18 |
| 31 | 10 | 60 | 30 | 19 |
| 32 | 40 | 50 | 10 | 21 |
| 33 | 30 | 50 | 20 | 15 |
| 34 | 20 | 50 | 30 | 17 |
| 35 | 10 | 50 | 40 | 17 |
| 36 | 50 | 40 | 10 | 16 |
| 37 | 40 | 40 | 20 | 21 |
| 38 | 30 | 40 | 30 | 14 |
| 39 | 20 | 40 | 40 | 16 |
| 40 | 10 | 40 | 50 | 19 |
| 41 | 60 | 30 | 10 | 16 |
| 42 | 50 | 30 | 20 | 13 |
| 43 | 40 | 30 | 30 | 13 |
| 44 | 30 | 30 | 40 | 12 |
| 45 | 20 | 30 | 50 | 13 |
| 46 | 10 | 30 | 60 | 15 |
| 47 | 50 | 20 | 30 | 14 |
| 48 | 40 | 20 | 40 | 16 |
| 49 | 30 | 20 | 50 | 17 |
| 50 | 20 | 20 | 60 | 17 |
| 51 | 10 | 20 | 70 | 17 |

EXAMPLES 52-66

The experiment of Example 1 was repeated except that Versamid 725 was selected as the polyamide. The solvent systems had the compositions and viscosities set forth in Examples 52-66 and shown graphically in FIGURE 3. The solvent systems within the enclosed area are suitable for the practice of this invention and solvent systems within the shaded area are preferred. The compositions of these examples were clear solutions and deposited clear films, except for the compositions of Examples 52, 53 and 58, which deposited films having a very slight haze.

Printing inks are prepared by incorporating into these compositions a pigment or mixture of pigments selected to provide the desired color and in an amount to provide the desired opacity. They can be thinned at the press to the desired viscosity as needed.

COMPOSITION OF SOLVENT SYSTEM

| Example No. | 2-nitropropane, ml. | Isopropyl Alcohol, ml. | Lactol Spirits, ml. | Viscosity, Centipoises |
|---|---|---|---|---|
| 52 | 5 | 90 | 5 | 36 |
| 53 | 10 | 80 | 10 | 27 |
| 54 | 20 | 70 | 10 | 23 |
| 55 | 10 | 70 | 20 | 26 |
| 56 | 30 | 60 | 10 | 19 |
| 57 | 20 | 60 | 20 | 21 |
| 58 | 10 | 60 | 30 | 22 |
| 59 | 40 | 50 | 10 | 19 |
| 60 | 30 | 50 | 20 | 18 |
| 61 | 20 | 50 | 30 | 19 |
| 62 | 10 | 50 | 40 | 20 |
| 63 | 40 | 40 | 20 | 17 |
| 64 | 30 | 40 | 30 | 18 |
| 65 | 20 | 40 | 40 | 17 |
| 66 | 10 | 40 | 50 | 20 |

EXAMPLES 67–80

The experiment of Example 1 was repeated except that Versamid 940 was selected as the polyamide. The solvent systems had the compositions and viscosities set forth in Examples 67–80 and shown graphically in FIGURE 4. The solvent systems within the enclosed area are suitable for the practice of this invention and the systems within the shaded area are preferred. The compositions of these examples were clear solutions and deposited clear films except the compositions of Examples 73 and 76 in which the films were slightly hazy.

Printing inks are prepared by incorporating into these compositions a pigment or mixture of pigments selected to provide the desired color and in an amount to provide the desired opacity. They can be thinned at the press to the desired viscosity as needed.

COMPOSITION OF SOLVENT SYSTEM

| Example No. | 2-nitropropane, ml. | Isopropyl Alcohol, ml. | Lactol Spirits, ml. | Viscosity, Centipoises |
|---|---|---|---|---|
| 67 | 10 | 80 | 10 | 74 |
| 68 | 20 | 70 | 10 | 63 |
| 69 | 10 | 70 | 20 | 68 |
| 70 | 30 | 60 | 10 | 55 |
| 71 | 20 | 60 | 20 | 53 |
| 72 | 10 | 60 | 30 | 58 |
| 73 | 30 | 50 | 20 | 49 |
| 74 | 20 | 50 | 30 | 51 |
| 75 | 10 | 50 | 40 | 54 |
| 76 | 30 | 40 | 30 | 44 |
| 77 | 20 | 40 | 40 | 50 |
| 78 | 10 | 40 | 50 | 54 |
| 79 | 20 | 30 | 50 | 50 |
| 80 | 10 | 30 | 60 | 54 |

EXAMPLES 81–94

The experiment of Example 1 was repeated except that Versamid 930 was selected as the polyamide. The solvent systems had the compositions and viscosities set forth in Examples 81–94 and shown graphically in FIGURE 5. The solvent systems within the enclosed area are suitable for the practice of this invention and the systems within the shaded area are preferred. The compositions of these examples were clear solutions and deposited clear films, except for Examples 90, 91 and 94 in which the film was very slightly hazy.

Printing inks are prepared by incorporating into these compositions a pigment or mixture of pigments selected to provide the desired color and in an amount to provide the desired opacity. They can be thinned at the press to the desired viscosity as needed.

COMPOSITION OF SOLVENT SYSTEM

| Example No. | 2-nitropropane, ml. | Isopropyl Alcohol, ml. | Lactol Spirits, ml. | Viscosity, Centipoises |
|---|---|---|---|---|
| 81 | 10 | 80 | 10 | 97 |
| 82 | 20 | 70 | 10 | 82 |
| 83 | 10 | 70 | 20 | 87 |
| 84 | 30 | 60 | 10 | 71 |
| 85 | 20 | 60 | 20 | 73 |
| 86 | 10 | 60 | 30 | 84 |
| 87 | 30 | 50 | 20 | 72 |
| 88 | 20 | 50 | 30 | 74 |
| 89 | 10 | 50 | 40 | 85 |
| 90 | 40 | 40 | 20 | 95 |
| 91 | 30 | 40 | 30 | 69 |
| 92 | 20 | 40 | 40 | 73 |
| 93 | 10 | 40 | 50 | 80 |
| 94 | 20 | 30 | 50 | 75 |

EXAMPLES 95–119

The experiment of Example 1 was repeated except that Polyamid 1155 was selected as the polyamide. The solvent systems had the compositions and viscosities set forth in Examples 84 to 109 and shown graphically in FIGURE 6. The solvent systems within the enclosed area are suitable for the practice of this invention and those within the shaded area are preferred. The compositions of these examples were clear solutions and deposited clear films except those of Examples 106 and 111, in which the films were cloudy, and those of Examples 111, 112 and 116–119 in which the films were slightly hazy.

Printing inks are prepared by incorporating into these compositions a pigment or mixture of pigments selected to provide the desired color and in an amount to provide the desired opacity. They can be thinned at the press to the desired viscosity as needed.

COMPOSITION OF SOLVENT SYSTEM

| Example No. | 2-nitropropane, ml. | Isopropyl Alcohol, ml. | Lactol Spirits, ml. | Viscosity, Centipoises |
|---|---|---|---|---|
| 95 | 5 | 90 | 5 | 27 |
| 96 | 10 | 80 | 10 | 25 |
| 97 | 20 | 70 | 10 | 19 |
| 98 | 10 | 70 | 20 | 21 |
| 99 | 30 | 60 | 10 | 15 |
| 100 | 20 | 60 | 20 | 18 |
| 101 | 10 | 60 | 30 | 18 |
| 102 | 40 | 50 | 10 | 15 |
| 103 | 30 | 50 | 20 | 14 |
| 104 | 20 | 50 | 30 | 15 |
| 105 | 10 | 50 | 40 | 19 |
| 106 | 50 | 40 | 10 | 14 |
| 107 | 40 | 40 | 20 | 13 |
| 108 | 30 | 40 | 30 | 15 |
| 109 | 20 | 40 | 40 | 17 |
| 110 | 10 | 40 | 50 | 17 |
| 111 | 50 | 30 | 20 | 13 |
| 112 | 40 | 30 | 30 | 14 |
| 113 | 30 | 30 | 40 | 15 |
| 114 | 20 | 30 | 50 | 17 |
| 115 | 10 | 30 | 60 | 18 |
| 116 | 40 | 20 | 40 | 17 |
| 117 | 30 | 20 | 50 | 17 |
| 118 | 20 | 20 | 60 | 20 |
| 119 | 10 | 20 | 70 | 24 |

EXAMPLES 120–138

The experiment of Example 1 was repeated except that Polymid 1074 was selected as the polyamide. The solvent systems had the compositions and viscosities set forth in Examples 120–138 and shown graphically in FIGURE 7. The solvent systems within the area ACEA are suitable for the practice of this invention. The preferred solvent systems are represented by the area ABGDEA and the particularly preferred solvent systems are represented by the area FGDEF. The compositions of Examples 120–131 were very slightly hazy in appearance but deposited clear films. The compositions of Example 135 and 138 were clear and deposited clear films. The compositions of Examples 132–134, 136 and 137 were clear solutions but deposited slightly hazy films.

Printing inks are prepared by incorporating into these compositions a pigment or mixture of pigments selected to provide the desired color and in an amount to provide the desired opacity. They can be thinned at the press to the desired viscosity as needed.

COMPOSITION OF SOLVENT SYSTEM

| Example No. | 2-nitropropane, ml. | Isopropyl Alcohol, ml. | Lactol Spirits, ml. | Viscosity, Centipoises |
|---|---|---|---|---|
| 120 | 5 | 90 | 5 | 165 |
| 121 | 10 | 80 | 10 | 155 |
| 122 | 20 | 70 | 10 | 109 |
| 123 | 10 | 70 | 30 | 129 |
| 124 | 30 | 60 | 10 | 81 |
| 125 | 20 | 60 | 20 | 94 |
| 126 | 10 | 60 | 30 | 96 |
| 127 | 10 | 60 | 30 | 96 |
| 128 | 40 | 50 | 10 | 80 |
| 129 | 30 | 50 | 20 | 83 |
| 130 | 20 | 50 | 30 | 89 |
| 131 | 10 | 50 | 40 | 97 |
| 132 | 40 | 40 | 20 | 89 |
| 133 | 30 | 40 | 30 | 79 |
| 134 | 20 | 40 | 40 | 85 |
| 135 | 10 | 40 | 50 | 90 |
| 136 | 30 | 30 | 40 | 87 |
| 137 | 20 | 30 | 50 | 90 |
| 138 | 10 | 30 | 60 | 98 |

EXAMPLES 139–159

Figure 8:
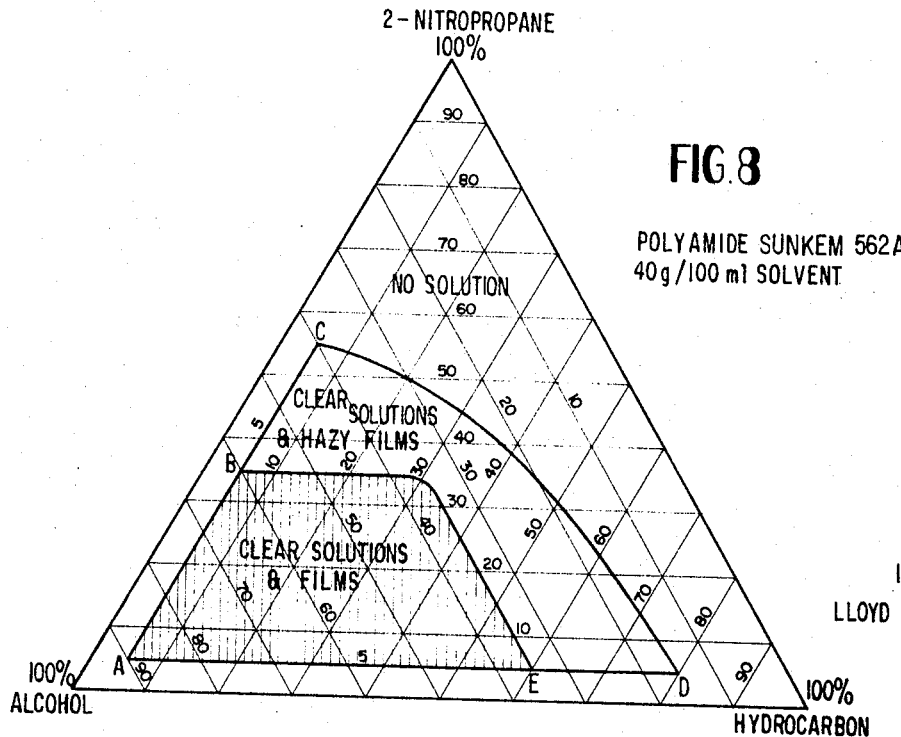

The experiment of Example 1 was repeated except that Sunkem 526A was selected as the polyamide. The solvent systems had the compositions and viscosities set forth in Examples 139–163 and shown graphically in FIGURE 8. The solvent systems within the area ACDA are suitable for the practice of this invention and the solvent systems within the area ABEA are preferred. The compositions of these examples were clear solutions and deposited clear films, except those of Examples 146, 150–151, and 155–158 in which the films were cloudy to slightly hazy.

Printing inks are prepared by incorporating into these compositions a pigment or mixture of pigments selected to provide the desired color and in an amount to provide the desired opacity. They can be thinned at the press to the desired viscosity as needed.

COMPOSITION OF SOLVENT SYSTEM

| Example No. | 2-nitropropane, ml. | Isopropyl Alcohol, ml. | Lactol Spirits, ml. | Viscosity, Centipoises |
|---|---|---|---|---|
| 139 | 5 | 90 | 5 | 46 |
| 140 | 10 | 80 | 10 | 35 |
| 141 | 20 | 70 | 10 | 37 |
| 142 | 10 | 70 | 20 | 30 |
| 143 | 30 | 60 | 10 | 22 |
| 144 | 20 | 60 | 20 | 25 |
| 145 | 10 | 60 | 30 | 28 |
| 146 | 40 | 50 | 10 | 21 |
| 147 | 30 | 50 | 20 | 25 |
| 148 | 20 | 50 | 30 | 25 |
| 149 | 10 | 50 | 40 | 27 |
| 150 | 50 | 40 | 10 | 24 |
| 151 | 40 | 40 | 20 | 26 |
| 152 | 30 | 40 | 30 | 26 |
| 153 | 20 | 40 | 40 | 22 |
| 154 | 10 | 40 | 50 | 26 |
| 155 | 50 | 30 | 20 | 30 |
| 156 | 40 | 30 | 30 | 20 |
| 157 | 30 | 30 | 40 | 20 |
| 158 | 20 | 30 | 50 | 20 |
| 159 | 10 | 30 | 60 | 24 |

EXAMPLES 160–173

The experiment of Example 1 was repeated except that Emerez 1535 was selected as the polyamide. The solvent systems had the compositions and viscosities set forth in Examples 160–173 and shown graphically in FIGURE 9. The solvent systems within the area ACEA are suitable for the practice of this invention and the solvent systems within the area ABDEA are preferred. The compositions of these examples were clear solutions and deposited clear films, except for the compositions of Examples 164, 165, 167, 168 and 171 which deposited hazy films.

Printing inks are prepared by incorporating into these compositions a pigment or mixture of pigments selected to provide the desired color and in an amount to provide the desired opacity. They can be thinned at the press to the desired viscosity as needed.

COMPOSITION OF SOLVENT SYSTEM

| Example No. | 2-nitropropane, ml. | Isopropyl Alcohol, ml. | Lactol Spirits, ml. | Viscosity, Centipoises |
|---|---|---|---|---|
| 160 | 5 | 90 | 5 | 52 |
| 161 | 10 | 80 | 10 | 44 |
| 162 | 20 | 70 | 10 | 35 |
| 163 | 10 | 70 | 20 | 38 |
| 164 | 30 | 60 | 10 | 28 |
| 165 | 20 | 60 | 20 | 27 |
| 166 | 10 | 60 | 30 | 37 |
| 167 | 40 | 50 | 10 | 34 |
| 168 | 30 | 50 | 20 | 32 |
| 169 | 20 | 50 | 30 | 32 |
| 170 | 10 | 50 | 40 | 34 |
| 171 | 30 | 40 | 30 | 38 |
| 172 | 20 | 40 | 40 | 37 |
| 173 | 10 | 40 | 50 | 36 |

EXAMPLES 174–191

The experiment of Example 1 was repeated except that Emerez 1530 was selected as the polyamide. The solvent systems had the compositions and viscosities set forth in Examples 174–191 and shown graphically in FIGURE 10. The solvent compositions within the area ACDA are suitable for the practice of this invention and the solvent systems within the area ABEA are preferred. The compositions of Examples 174–180 were clear solutions and deposited clear films. The compositions of Examples 181–191 were hazy solutions but the compositions of Examples 182–184 and 189–191 deposited clear films. The compositions of Examples 181 and 185–188 deposited hazy films.

Printing inks are prepared by incorporating into these compositions a pigment or mixture of pigments selected to provide the desired color and in an amount to provide the desired opacity. They can be thinned at the press to the desired viscosity as needed.

COMPOSITION OF SOLVENT SYSTEM

| Example No. | 2-nitropropane, ml. | Isopropyl Alcohol, ml. | Lactol Spirits, ml. | Viscosity, Centipoises |
|---|---|---|---|---|
| 174 | 5 | 90 | 5 | 132 |
| 175 | 10 | 80 | 10 | 110 |
| 176 | 20 | 70 | 10 | 98 |
| 177 | 10 | 70 | 20 | 99 |
| 178 | 30 | 60 | 10 | 86 |
| 179 | 20 | 60 | 20 | 85 |
| 180 | 10 | 60 | 30 | 97 |
| 181 | 40 | 50 | 10 | 69 |
| 182 | 30 | 50 | 20 | 81 |
| 183 | 20 | 50 | 30 | 82 |
| 184 | 10 | 50 | 40 | 86 |
| 185 | 10 | 20 | 70 | 107 |
| 186 | 30 | 30 | 40 | 81 |
| 187 | 40 | 40 | 20 | 72 |
| 188 | 30 | 30 | 30 | 81 |
| 189 | 20 | 40 | 40 | 110 |
| 190 | 10 | 40 | 50 | 82 |
| 191 | 50 | 30 | 20 | 72 |

What is claimed is:

1. A printing ink composition comprising a polyamide resin vehicle said polyamide being a polymer of dimerized linoleic acid and ethylene diamine having a molecular weight within the range of from 6,000 to 9,000 and the solvent system has a composition within the scope of the area ACDEA of FIGURE 4.

2. The composition of claim 1 wherein the solvent system has a composition within the scope of the shaded area ABDEA of FIGURE 4.

3. The composition of claim 1 wherein the solvent system has a composition within the scope of the area ABCDA of FIGURE 5.

4. The composition of claim 3 wherein the solvent system has a composition within the scope of the shaded area ABDA of FIGURE 5.

5. A solvent composition for a polyamide resin soluble therein consisting of from approximately 5% to approximately 65% by volume at ambient temperatures of 2-nitropropane, from approximately 5% to approximately 80% of an aliphatic hydrocarbon having a boiling range of from within about 200° F. to about 280° F. and from approximately 15% to approximately 90% of an aliphatic alcohol having from 2 to 3 carbon atoms.

6. The composition of claim 5 wherein the aliphatic alcohol is ethanol.

7. The composition of claim 5 wherein the aliphatic alcohol is isopropyl alcohol.

8. The composition of claim 5 wherein the 2-nitropropane content is from 5–45%, the alcohol is from 25–90%, and the hydrocarbon from 5–70%.

9. The composition of the claim 5 wherein the 2-nitropropane content is from 5–35%, the alcohol from 25–80%, and the hydrocarbon from 5–65%.

References Cited

UNITED STATES PATENTS

| | | | |
|---|---|---|---|
| 2,377,985 | 6/1945 | Watkins | 260—32.4 |
| 3,034,997 | 5/1962 | Dunne et al. | 260—33.4 |

OTHER REFERENCES

Apps: Ink Technology for Printers and Students; Part 3; Inks for the Minor Printing Processes and Specialized Applications; 1963; Leonard Hill: London; pp. 13, 14, 23, 24; Sci. Lib.

Mellan: Handbook of Solvents; vol. 1; Pure Hydrocarbons; Reinhold Publishing Corp.; 1957; p. 92; Sci. Lib.

MORRIS LIEBMAN, Primary Examiner.

L. T. JACOBS, Assistant Examiner.

U.S. Cl. X.R.

260—32.4, 33.6